No. 673,055. Patented Apr. 30, 1901.
J. HUBBARD.
PNEUMATIC TIRE.
(Application filed May 26, 1900.)
(No Model.)

Witnesses,
Thos. Wilson.
John J Fazakarley.

Inventor,
John Hubbard,
per, Douglas Leechman
attorney.

UNITED STATES PATENT OFFICE.

JOHN HUBBARD, OF UPPER HOLLOWAY, ENGLAND.

PNEUMATIC TIRE.

SPECIFICATION forming part of Letters Patent No. 673,055, dated April 30, 1901.

Application filed May 26, 1900. Serial No. 18,138. (No model.)

*To all whom it may concern:*

Be it known that I, JOHN HUBBARD, tire expert, a subject of the Queen of Great Britain, residing at 6 Pemberton Gardens, Upper Holloway, in the county of Middlesex, England, have invented certain new and useful Improvements in Pneumatic Tires, of which the following is a specification.

My invention relates to pneumatic tires for the wheels of vehicles and the like of that class in which the endless outer cover or restraining-envelop is formed of layers of threads or wires such as are produced by means of a winding-machine for which I have obtained Letters Patent in the United States of America, No. 626,998, dated June 13, 1899.

In the tire produced by the above-mentioned winding-machine the threads or wires are not interwoven, but laid parallel to each other in a spiral direction around a collapsible mandrel in one or more layers, one layer being laid at an angle in an opposite direction to the one previously laid, all the threads in each layer being secured together by means of india-rubber solution or other adhesive, which secures the contiguous threads to one another, so that when the complete tire is wound the threads remain in their proper relative positions after the collapsible mandrel is removed.

My present invention consists in forming the tire so that the threads of that portion of the tire which come into contact with the metal or wooden rim of the wheel upon which it is mounted are not secured together by any adhesive substance, the consequence being that this interior circumference of the tire throughout its length consists of a series of cross-threads which can easily be displaced and through which it is possible to readily withdraw the air-tube at any point for repair in the event of a puncture occurring in same.

In some cases I cover the outer layer of threads with a thin woven fabric or other material, which is attached to the layer of threads by an adhesive substance. In this case I make cuts or incisions at intervals in the same direction as the threads to which the material is attached, and through these openings the air-tube can be withdrawn with the object as before described.

In order that my invention may be more readily understood, I have appended drawings herewith, in which—

Figure 1:
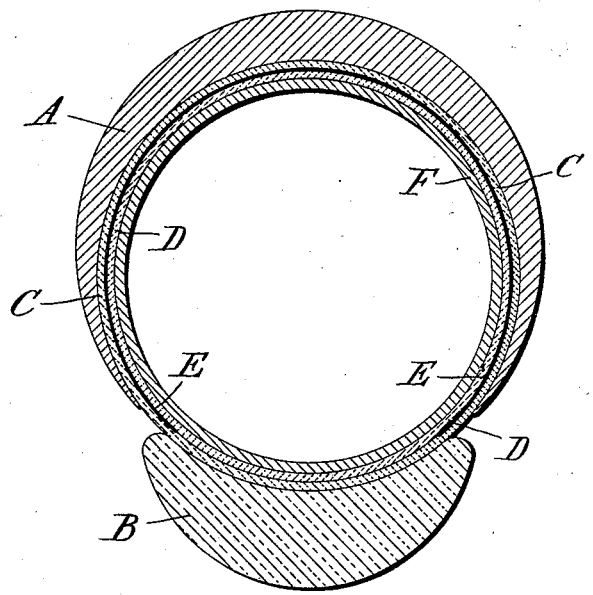
Figure 2:
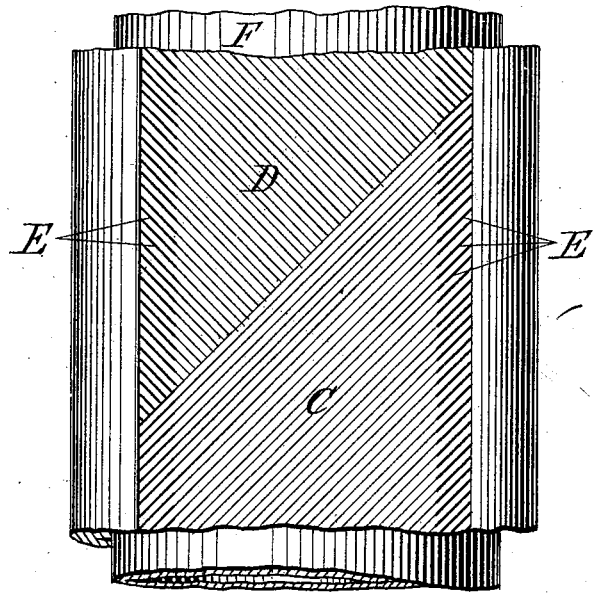

Figure 1 is a cross-section of the tire and rim; and Fig. 2 is a part plan of the tire, showing the interior circumference or part which comes into contact with the rim.

A is the complete tire, and B the rim. The restraining envelop or casing of the tire consists of two or more layers of thread or wire C and D, wound upon a circular mandrel in close contact with each other in a spiral direction at any suitable angle, which for the purpose of illustration in this case are shown at an angle of forty-five degrees with the center line of the tire, and consequently at right angles with each other. The threads are laid in a dry condition upon the mandrel, and the laid threads are then treated with an adhesive substance over a portion of the diameter of the tube, as shown by the thickened lines in the drawing at E, thus leaving the center portion of the inner circumference of the tire free of any adhesive. By inserting the finger or fingers between the threads at this portion of the tire the threads are readily displaced to form an aperture through which the air-tube F when in a deflated condition can be easily withdrawn for repair in the event of a puncture occurring therein. When the air-tube F is replaced, the threads will return to their proper relative positions automatically.

Tires constructed in the manner above described are not fastened to the rim by means of wires, thickened edges, hooks, or other mechanical means, but grip the rim by the contractile action produced by the inflation thereof, as is well known, and are easily attached and detached.

I have only described one way of covering a portion of the circumference of the tire with adhesive material, but any suitable means could be adopted.

What I claim is—

In a pneumatic tire for the wheels of vehicles and the like, in which the outer cover or envelop is formed of a series of spirally-wound threads or wires in separate layers, crossing each other at an angle, such envelop being adapted to withstand the pressure of an independent inclosed tube, when mounted upon the rim of a wheel, treating one portion of the outer envelop so that its threads are suitably connected or cemented together, the remaining portion having no such means of attachment, the latter portion having free threads which can be easily displaced so as to permit of the inclosed tube being inserted or withdrawn, when the component parts are in a collapsed condition, as and for the purpose herein described and illustrated.

In testimony whereof I have hereunto set my hand, in presence of two subscribing witnesses, this 10th day of May, 1900.

JOHN HUBBARD.

Witnesses:
J. GLOVER,
JOSEPH LAKE.